United States Patent
An et al.

(10) Patent No.: US 7,417,951 B2
(45) Date of Patent: Aug. 26, 2008

(54) APPARATUS AND METHOD FOR LIMITING BANDWIDTHS OF BURST AGGREGATE FLOWS

(75) Inventors: Gaeil An, Daejeon (KR); Ki Young Kim, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 714 days.

(21) Appl. No.: 10/934,545

(22) Filed: Sep. 3, 2004

(65) Prior Publication Data
US 2005/0152375 A1 Jul. 14, 2005

(30) Foreign Application Priority Data
Dec. 17, 2003 (KR) ............ 10-2003-0092569
Apr. 19, 2004 (KR) ............ 10-2004-0026639

(51) Int. Cl.
H04L 12/28 (2006.01)
(52) U.S. Cl. ............ 370/231; 370/395.41; 370/445
(58) Field of Classification Search ............ 370/229, 370/230, 233, 412, 231, 445
See application file for complete search history.

(56) References Cited

U.S. PATENT DOCUMENTS

| | | | |
|---|---|---|---|
| 6,252,848 B1* | 6/2001 | Skirmont | 370/229 |
| 6,330,225 B1* | 12/2001 | Weber et al. | 370/231 |
| 6,556,578 B1* | 4/2003 | Silberschatz et al. | 370/412 |
| 6,657,960 B1* | 12/2003 | Jeffries et al. | 370/230.1 |
| 6,754,177 B1* | 6/2004 | Gersht et al. | 370/233 |
| 6,816,456 B1* | 11/2004 | Tse-Au | 370/230.1 |
| 6,826,147 B1* | 11/2004 | Nandy et al. | 370/229 |
| 7,002,911 B1* | 2/2006 | Linville et al. | 370/230 |
| 2002/0120768 A1* | 8/2002 | Kirby et al. | 709/235 |
| 2004/0170123 A1* | 9/2004 | Carpenter et al. | 370/229 |

FOREIGN PATENT DOCUMENTS

| | | |
|---|---|---|
| KR | 1020030009887 | 2/2003 |
| WO | WO 02/33870 | 4/2002 |

OTHER PUBLICATIONS

Controlling High Bandwidth Aggregates in the Network, (Extented version)☐☐Mahajan et al.☐☐Jul. 13, 2001.*
"Controlling High Bandwidth Aggregates in the Network", R. Mahajan, et al., ACM SIGCOMM computer communications review, vol. 32, No. 3, Jul. 2002, pp. 62-73.

* cited by examiner

*Primary Examiner*—Hassan Kizou
*Assistant Examiner*—Emmanuel Maglo
(74) *Attorney, Agent, or Firm*—Blakely, Sokoloff, Taylor & Zafman LLP

(57) ABSTRACT

Provided are an apparatus and method for limiting bandwidths of burst aggregate flows according to the present invention. The apparatus comprises: a bandwidth measuring unit measuring a bandwidth of at least one input aggregate flow; a grade determining unit determining abnormal grades according to abnormal levels of the input aggregate flows; a bandwidth limit determining unit determining a bandwidth volume and aggregate flow to be limited; a bandwidth limiting unit inputting a result determined by the bandwidth limit determining unit, limiting or releasing a bandwidth of a aggregate flow selected among the input aggregate flows and outputting the selected aggregate flow; and a status information storage unit storing status information including a usage bandwidth, an abnormal grade, and a limited bandwidth volume of the input aggregate flow. Accordingly, the apparatus and method provide an effect of dropping attack aggregate flows corresponding to excessive traffic while not influencing normal aggregate flows.

9 Claims, 4 Drawing Sheets

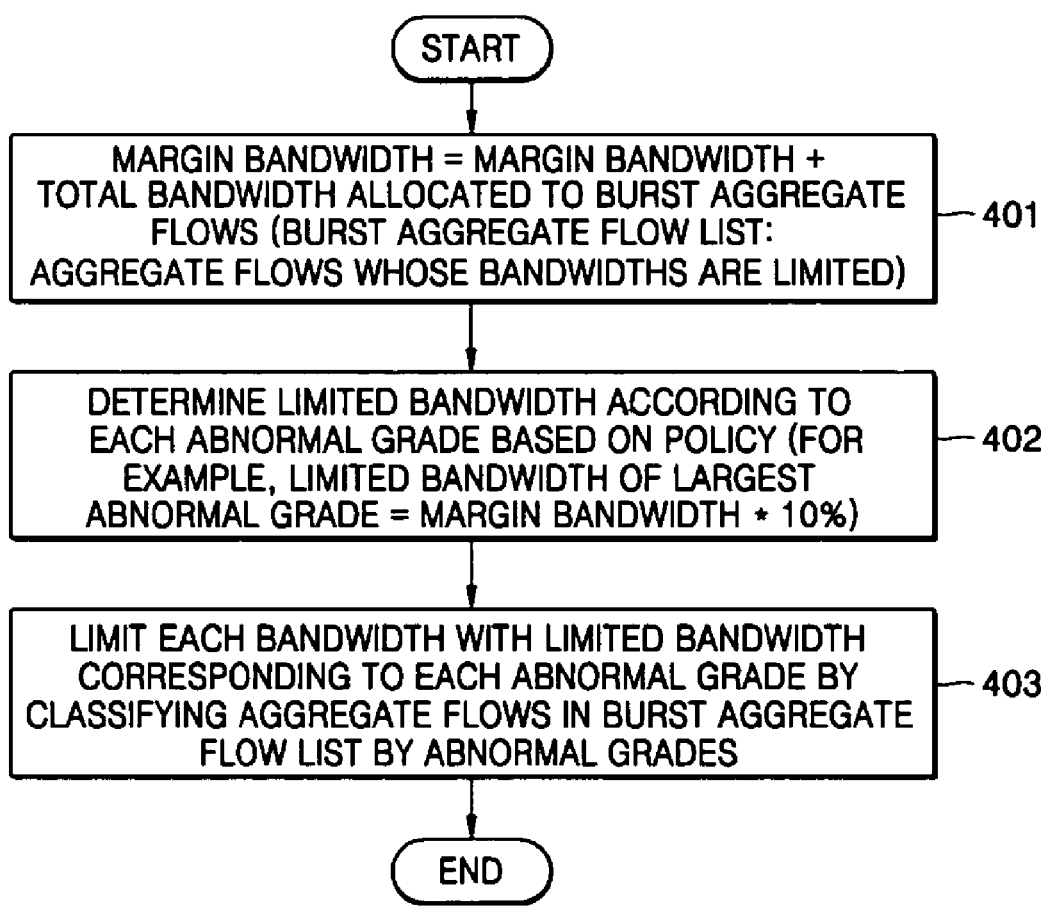

140
APPARATUS AND METHOD FOR LIMITING BANDWIDTHS OF BURST AGGREGATE FLOWS

BACKGROUND OF THE INVENTION

This application claims the priority of Korean Patent Application Nos. 2003-92569, filed on Dec. 17, 2003 and 2004-26639, filed on Apr. 19, 2004 in the Korean Intellectual Property Office, the disclosures of which are incorporated herein in their entirety by reference.

1. Field of the Invention

The present invention relates to an apparatus and method for limiting bandwidths of burst aggregate flows which act to deteriorate network service quality by generating abnormal and excessive traffic, such as denial of service (DoS) attacks and worm scan attacks.

2. Description of the Related Art

Attacks, which generate excessive traffic, cause network congestion by concentrating a lot of traffic over a short time. Therefore, the attacks may act to deteriorate service quality provided to authenticated users and finally paralyze the attacked network. Conventional technologies for preventing a network congestion are as follows.

(1) Queuing Technology

A packet to be dropped when a network is congested or in order to prevent network congestion is determined using queuing technology. As methods of determining the packet to be dropped, first-in first-out (FIFO), fair queuing (FQ), and random early detection (RED) have been suggested. In a case of traffic following a network status, that is, traffic where the transmission amount decreases if it is detected that the network status is in a congested state, the conventional queuing technology provides a significant effect for dropping or preventing the network congestion. However, in DoS attacks continuously generating excessive traffic even in the congested state or many kinds of artificial flows, the excessive traffic cannot be controlled by those technologies.

(2) Intrusion Detection and Prevention Technology

An intrusion detection system has been suggested to detect activities, such as scanning, hacking, or paralyzing a target system by generating abnormal packets or flows, in a network. The intrusion detection system drops traffic recognized as an attack by linked to a firewall or with its own ability. The latter is called an "intrusion prevention system", which detects and then drops the intrusions by itself. The intrusion prevention system uses a technology for protecting a destination system and a network by detecting the attacking activities and then early dropping them. However, the biggest problem of the intrusion prevention system is a false-positive problem of dropping normal traffic, which occurs when the normal traffic is wrongly determined as attack traffic. Due to this problem, most systems are operated by a method of automatically detecting attacks and manually dropping the attacks by a manager's decision.

(2) Threshold—Based Rate-limit

This technology drops DoS attacks by transmitting or discarding each packet by comparing measured traffic volumes and threshold values, respectively. The threshold values are obtained using statistic values obtained by directly measuring each subscriber's traffic. This technology provides an effect of dropping the DoS attacks since the amount of traffic cannot exceed the threshold values. However, it is impossible to precisely measure the threshold values. Therefore, when the threshold values are not accurately measured, it may lead to the false-positive problem of dropping normal traffic.

(4) Aggregate Congestion Control (ACC)

ACC technology monitors a status of a packet transmission queue in each interface of router. In the ACC technology, if the packet transmission queue is full for a predetermined time, a network status is regarded as a congested status, and the congested network status is solved by classifying packets with aggregate flows according to destination addresses of the packets and limiting bandwidths of the aggregate flows each having a relatively larger bandwidth. Since this technology limits bandwidths of aggregate flows according to a destination address, a DoS attack on a specific destination address can be effectively dropped. However, this technology requires new protocol for communication between routers, and since a bandwidth is limited only by a traffic volume without checking whether a packet is abnormal, the false-positive problem cannot be completely solved.

As described above, the conventional technologies for counter-attack against abnormal burst traffic provide partial effects. However, the technologies cannot radically drop various attacks, such as a DoS attack and a worm scan attack. Also, the technologies may generate the false-positive problem.

SUMMARY OF THE INVENTION

The present invention provides an apparatus and method for protecting normal aggregate flows and dropping early only attack aggregate flows causing abnormal excessive traffic by synthetically determining a current status of a network, usage bandwidths of aggregate flows, and abnormal grades of the aggregate flows, and precisely determining the limit of the bandwidth and what bandwidths of aggregate flows are limited.

According to an aspect of the present invention, there is provided an apparatus for limiting bandwidths of burst aggregate flows, the apparatus comprising: a bandwidth measuring unit measuring a bandwidth of at least one input aggregate flow on the basis of predetermined information representing the characteristics of the aggregate flows; a grade determining unit determining the abnormal grades according to the abnormal levels of the input aggregate flows; a bandwidth limit determining unit determining a bandwidth volume and an aggregate flow to be limited on the basis of the measured bandwidth and an abnormal grade; a bandwidth limiting unit inputting a result determined by the bandwidth limit determining unit, limiting or releasing a bandwidth of an aggregate flow selected among the input aggregate flows and outputting the selected aggregate flow; and a status information storage unit storing status information, including a usage bandwidth, an abnormal grade, and a limited bandwidth volume of the input aggregate flow.

According to another aspect of the present invention, there is provided a method of limiting bandwidths of burst aggregate flows, the method comprising: (a) obtaining bandwidth information of at least one input aggregate flow, determining abnormal grades of the input aggregate flows, and storing the result; (b) determining whether a network congestion risk exists by comparing a total bandwidth of the input aggregate flows with predetermined bandwidths allocated to normal aggregate flows; (c) if it is determined that the network congestion risk exists in step (b), determining burst aggregate flows, the bandwidths of which are limited, and storing the result; (d) determining bandwidth volumes to be limited with respect to the burst aggregate flows, the bandwidths of which are limited, and storing the result; and (e) if it is determined that the network congestion risk does not exist in step (b), releasing the aggregate flows, the bandwidths of which have been limited, and storing the result.

BRIEF DESCRIPTION OF THE DRAWINGS

The above and other features and advantages of the present invention will become more apparent by describing in detail exemplary embodiments thereof with reference to the attached drawings in which:

FIG. 4 is a flowchart of a process of determining bandwidth volumes to be limited with respect to the burst aggregate flows determined in the process of FIG. 3.

DETAILED DESCRIPTION OF THE INVENTION

Hereinafter, the present invention will now be described more fully with reference to the accompanying drawings, in which embodiments of the invention are shown. Like reference numbers are used to refer to like elements through at the drawings.

First, an outline of an apparatus and method for limiting and releasing bandwidths of aggregate flows according to the present invention will now be described. On the basis of information, including source IP addresses, protocols, and destination port numbers, aggregate flows are defined, and bandwidths of the aggregate flows are measured and limited. When it is determined that a receiving packet is a kind of attack, an abnormal grade is determined by synthesizing the type and risk level of the attack. Examining whether the network is in a hazardous state is very important for dropping burst type attack aggregate flows in advance and protecting normal aggregate flows before the network is congested.

Also, when a burst aggregate flow is identified, it is preferable for improving accuracy that it be determined whether a current aggregate flow is a burst aggregate flow by synthetically determining not only the bandwidth information of the aggregate flow, but also an abnormal level and a current network status (hazard or normal).

Therefore, it is effective that aggregate flows each having a high abnormal level and wide bandwidth are determined as the burst aggregate flows.

Also, when the network is in the hazardous state, to maximize a source efficiency, it is preferable that bandwidths remained by use of the normal aggregate flows be provided to the burst aggregate flows.

Figure 1:
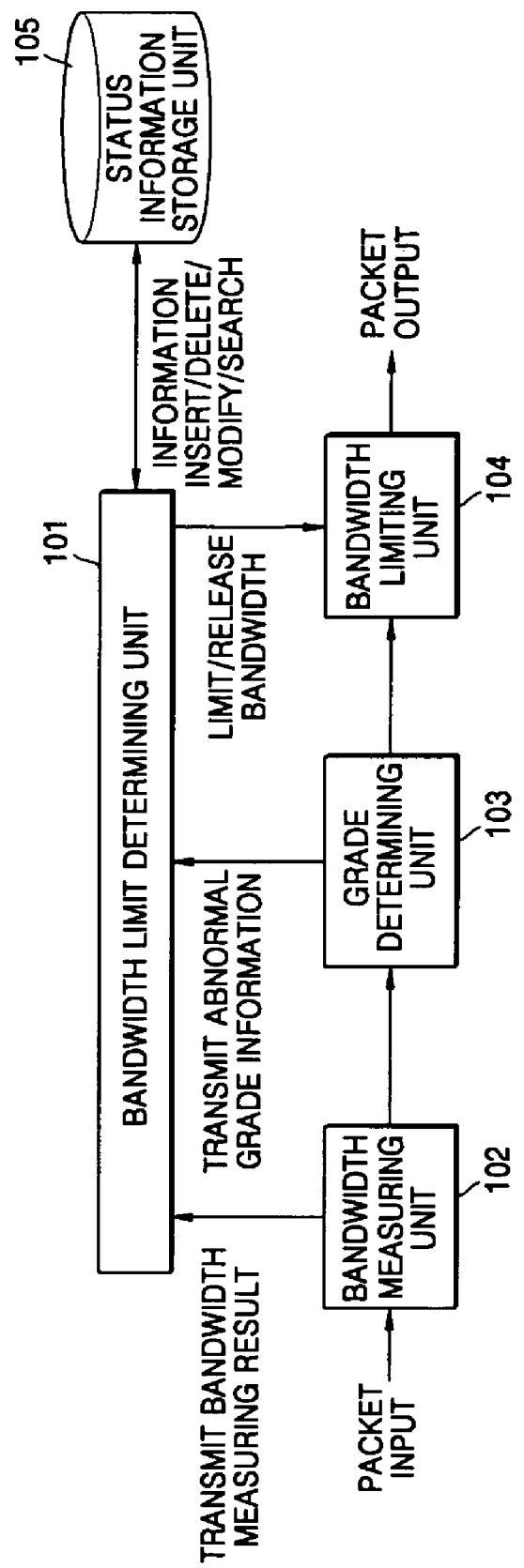
FIG. 1 is a block diagram of an apparatus for limiting bandwidths of burst aggregate flows to drop abnormal burst attack aggregate flows according to an embodiment of the present invention.

FIG. 1 is a block diagram of an apparatus for limiting bandwidths of burst aggregate flows to drop abnormal burst attack aggregate flows according to an embodiment of the present invention. An apparatus for limiting bandwidths of burst aggregate flows as shown in FIG. 1 can be applied to and operated in any network equipment that can identify aggregate flows.

Referring to FIG. 1, the bandwidth limit apparatus includes a bandwidth limit determining unit 101, which synthetically evaluates a usage bandwidth, an abnormal grade of each aggregate flow and network state, and then determines burst aggregate flows and their traffic volumes, a bandwidth measuring unit 102, which measures a bandwidth of each aggregate flow, a glade determining unit 103, which determines an abnormal level of each aggregate flow, a bandwidth limiting unit 104, which limits a bandwidth of a specific aggregate flow, and a status information storage unit 105, which stores the status information of each of the aggregate flows. The bandwidth measuring unit 102 classifies a packet received from a network as an aggregate flow according to a standard to be described later, measures a usage bandwidth of each aggregate flow, and transmits bandwidth information to the bandwidth limit determining unit 101 periodically, or whenever a predetermined bandwidth is varied.

The aggregate flow according to the present invention is identified with a source IP address, a protocol, and a destination port number, and a granularity of the aggregate flow can be controlled by a manager. Aggregate flows with the same protocol and destination port number correspond to an aggregate flow class. For example, if the manager defines the aggregate flow class with the TCP protocol and a number eighty destination port, the number of aggregate flow classes is 2, that is, an aggregate flow class using the TCP number eighty destination port and an aggregate flow class not using the TCP number eighty destination port. Also, each aggregate flow class includes at least one aggregate flow according to source IP addresses. For example, if the manager defines a source IP address as a C class in a certain aggregate flow class, all flows corresponding to source IP addresses 1.1.1.0 through 1.1.1.255 correspond to an aggregate flow 1.1.1.0/24. Therefore, if an aggregate flow class is defined by defining a source IP address as the C class, the aggregate flow class can have a maximum of $2^{24}$ (about 1,000,000) aggregate flows.

Figure 2:
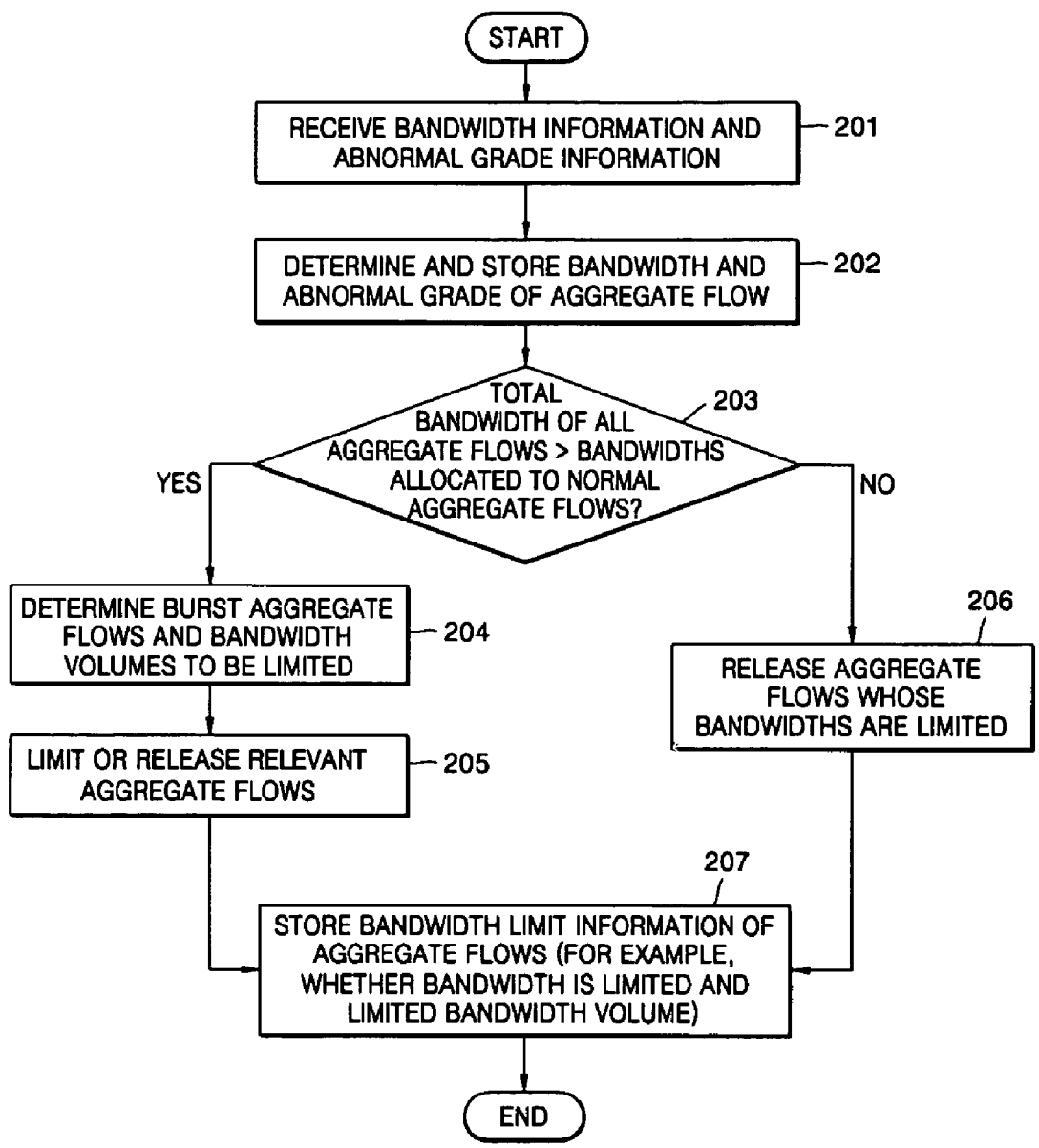
FIG. 2 is a flowchart of a process of limiting bandwidths of aggregate flows in a bandwidth limit determining unit of FIG. 1.
Figure 3:
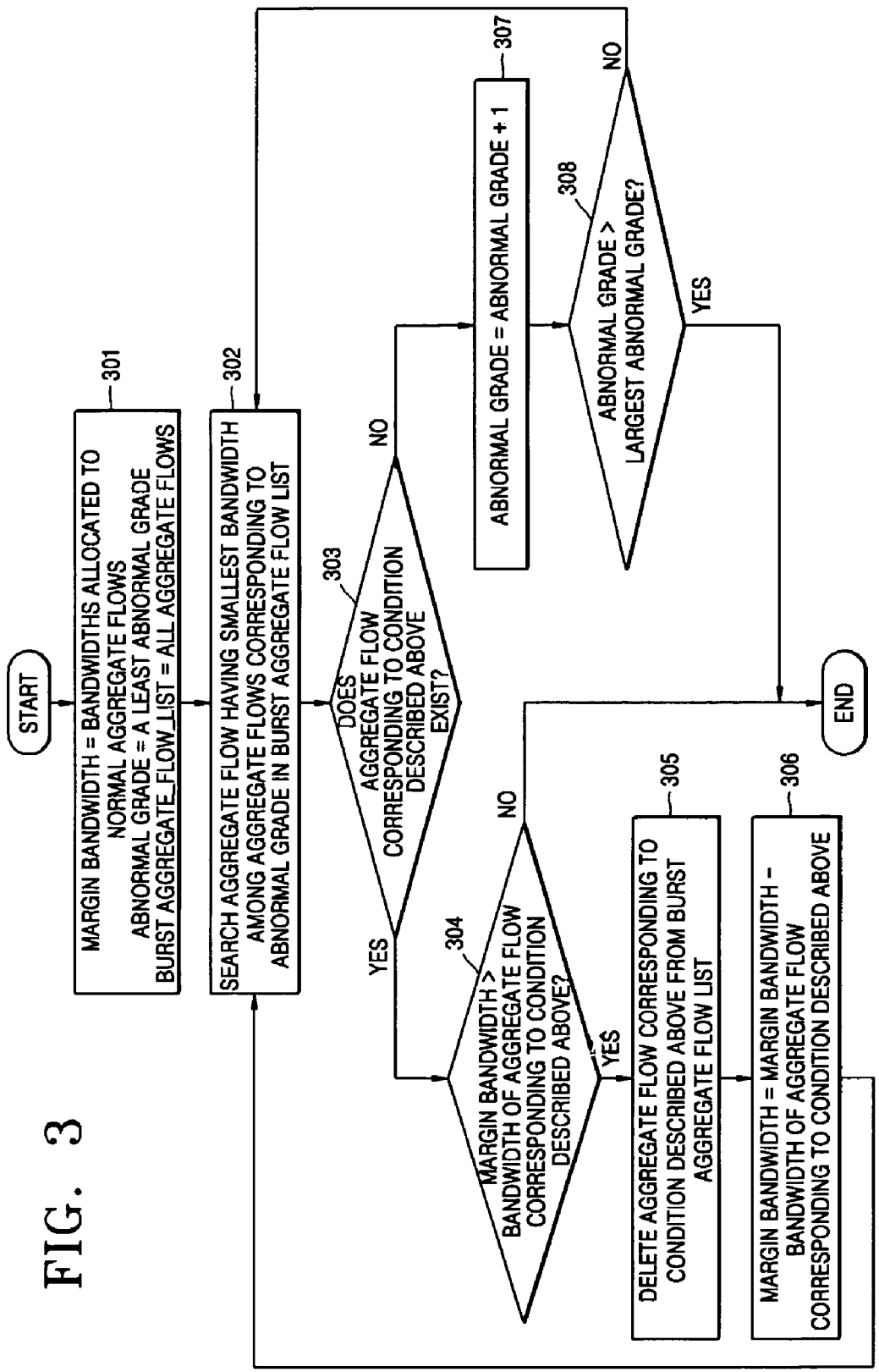
FIG. 3 is a flowchart of a process of determining burst aggregate flows, bandwidths of which are limited, when it is determined that the bandwidths are limited since network congestion is predicted among the process of FIG. 2.

Hereinafter, when FIGS. 2, 3, and 4 are described, it is assumed that there is a single aggregate flow class. That is, regardless of protocols or destination port numbers, the aggregate flows will be classified only with source IP addresses. The preferred embodiments should be considered in a descriptive sense only and not for the purposes of limitation.

The grade determining unit 103 basically performs the following function using an intrusion detection system based on a typical signature rule. When it is determined that a receiving packet is an attack, the grade determining unit 103 determines an abnormal grade by synthesizing the type and risk level of the attack and transmits the abnormal grade information to the bandwidth limit determining unit 101. Here, the higher the abnormal level, the higher the abnormal grade.

The bandwidth limiting unit 104 receives a command from the bandwidth limit determining unit 101 and limits or releases a bandwidth of a specific aggregate flow. The status information storage unit 105 stores usage bandwidths of aggregate flows measured by the bandwidth measuring unit 102, abnormal grades determined by the grade determining unit 103, and bandwidth volumes limited to relevant aggregate flows by the bandwidth limit determining unit 101.

The bandwidth limit determining unit 101 limits a bandwidth of an aggregate flow or releases the limited bandwidth by considering network status information about whether a current network is in a hazardous state or not and the status information (a usage bandwidth and an abnormal grade) of the aggregate flow.

According to the configuration as shown in FIG. 1, a detailed algorithm performed by the bandwidth limit determining unit 101 will be described with reference to FIGS. 2, 3, and 4.

FIG. 2 is a flowchart of a process of limiting bandwidths of aggregate flows in the bandwidth limit determining unit 101 of FIG. 1.

Referring to FIG. 2, the bandwidth limit determining unit 101 receives bandwidth information and abnormal information of aggregate flows from the each bandwidth measuring unit 102 and the grade determining unit 103, respectively in step 210. The bandwidth limit determining unit 101 determines an average bandwidth and abnormal grade using the received bandwidth information and abnormal information of a specific aggregate flow and stores the determined average bandwidth and abnormal grade in the status information storage unit 105 in step 202. To obtain a current status (hazard or normal) of a network, the bandwidth limit determining unit 101 compares a total bandwidth of all aggregate flows with a total bandwidth allocated to normal aggregate flows in step 203. Here, the total bandwidth allocated to normal aggregate flows are clearly defined by a manager. For example, if a total usable bandwidth is 100 Mbps, the manager can designate 90 Mbps as the total bandwidth allocated to normal aggregate flows. The other 10 Mbps is a total bandwidth allocated to burst aggregate flows.

If the total bandwidth of all aggregate flows is larger than the total bandwidth allocated to normal aggregate flows, the bandwidth limit determining unit 101 evaluates it as being in a network hazard status and determines aggregate flows, bandwidths of which are limited, and bandwidth volumes of the aggregate flows in step 204. According to the determination, the bandwidth limit determining unit 101 directs the bandwidth limiting unit 104 to limit or release a bandwidth of a specific aggregate flow in order to limit the bandwidths of aggregate flows determined as the burst aggregate flows and release the bandwidth limit applied to the aggregate flows determined as the normal aggregate flows in step 205.

On the contrary, if the total bandwidth of all aggregate flows is smaller than or equal to the total bandwidth allocated to normal aggregate flows, the bandwidth limit determining unit 101 evaluates it as being in a network normal status and directs the bandwidth limiting unit 104 to release a bandwidth of a specific aggregate flow in order to release the bandwidth limit of aggregate flows in step 206.

Finally, the bandwidth limit determining unit 101 stores bandwidth limit information (aggregate flows rate-limited and the volume of each limited bandwidth) on the change of aggregate flows according to the determination in the status information storage unit 105 in step 207.

When it is determined that a bandwidth is limited due to a network hazard status, a process of determining burst aggregate flows, bandwidths of which are limited, will be described with reference to FIG. 3.

In FIG. 3, a basic principle about a burst aggregate flow determination is that the bandwidth limit determining unit 101 regards aggregate flows with lower abnormal grades as normal aggregate flows, or, if abnormal grades are the same, regards aggregate flows with smaller usage bandwidths as normal aggregate flows, and determines aggregate flows not included in the normal aggregate flows as burst aggregate flows.

As an initializing process for determining the burst aggregate flows, a margin bandwidth variable, an abnormal grade variable, and a burst aggregate flow list are set as bandwidths allocated to normal aggregate flows, a least abnormal grade, and all aggregate flows, respectively, in step 301. An aggregate flow having the smallest bandwidth among the aggregate flows corresponding to the abnormal grades in the burst aggregate flow list is searched in step 302. If the aggregate flow does not exist in the burst aggregate flow list in step 303, one level is added to the abnormal grade in step 307, and the step 302 is repeated.

If the aggregate flow exists in the burst aggregate flow list in step 303, and if the margin bandwidth is larger than the bandwidth of the aggregate flow in step 304, the bandwidth limit determining unit 101 regards the aggregate flow as the normal aggregate flow and deletes the aggregate flow from the burst aggregate flow list in step 305. The bandwidth limit determining unit 101 readjusts the margin bandwidth by subtracting the bandwidth of the aggregate flow from the margin bandwidth in step 306.

This process is performed until the margin bandwidth is smaller than the margin bandwidth provided to the normal aggregate flow in step 304, or until there is no aggregate flow to be further searched in step 308. Here, the aggregate flows stored in the burst aggregate flow list are the burst aggregate flows; the bandwidths of which are limited.

A process of determining bandwidth volumes to be limited with respect to the burst aggregate flows determined in the process of FIG. 3 will be described with reference to FIG. 4.

To maximize resource efficiency, a margin bandwidth to be allocated to the burst aggregate flows is set as a value by adding the total bandwidth allocated to burst aggregate flows to the margin bandwidth remained in FIG. 3 in step 401. Bandwidths to be limited according to abnormal grades are calculated on the basis of a policy in step 402. Here, the policy is established so that a burst aggregate flow having a lower abnormal grade can use more resources than that of a burst aggregate flow having a higher abnormal grade. For example, the manager can establish a policy of providing 10% of the margin bandwidth to a burst aggregate flow corresponding to the highest abnormal grade as the limited bandwidth and 20% of the margin bandwidth to a burst aggregate flow corresponding to a lower abnormal grade as the limited bandwidth. Finally, the bandwidth limit determining unit 101 limits each bandwidth with the limited bandwidth corresponding to each abnormal grade by classifying aggregate flows in the burst aggregate flow list by the abnormal grades in step 403.

The method of limiting bandwidths of burst aggregate flows according to the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer readable code is stored and executed in a distributed fashion. A font ROM data structure according to the present invention can also be embodied as computer readable codes on a computer-readable recording medium, such as ROM, RAM, CD-ROMs, magnetic tapes, floppy disks, and optical data storage devices.

As described above, according to the present invention, an apparatus and method for limiting bandwidths of burst aggregate flows provide effects of dropping attack aggregate flows corresponding to abnormal and excessive traffic, such as DoS attacks and worm scan attacks while not influencing normal aggregate flows by being installed in a connecting end of a network.

In particular, since bandwidths and aggregate flows to be limited are determined by synthesizing not only bandwidth information of aggregate flows but also abnormal grades of the aggregate flows and a current network status, the false-positive problem of dropping normal traffic can be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for limiting bandwidths of burst aggregate flows, the apparatus comprising:
   a bandwidth measuring unit measuring a bandwidth of at least one input aggregate flow using characteristics of the at least one aggregate flows;
   a grade determining unit determining an abnormal grade according to an abnormal level of the at least one input aggregate flows;
   a bandwidth limit determining unit determining abnormal aggregate flows and their bandwidth to be limited on the basis of the measured bandwidth, abnormal grade, and a network state;
   a bandwidth limiting unit inputting a result determined by the bandwidth limit determining unit, limiting or releasing a bandwidth of the abnormal aggregate flows selected among the at least one input aggregate flow and outputting the selected aggregate flow; and
   a status information storage unit storing status information, including a usage bandwidth, an abnormal grade, and a limited bandwidth of the at least one input aggregate flows.

2. The apparatus of claim 1, wherein the bandwidth measuring unit measures the bandwidths of the at least one input aggregate flows on the basis of the predetermined information, including source IP addresses, protocols, and destination port numbers.

3. The apparatus of claim 1, wherein the bandwidth measuring unit transmits the measured bandwidth to the bandwidth limit determining unit on a predetermined schedule or whenever the measured bandwidth is varied.

4. The apparatus of claim 1, wherein the bandwidth limit determining unit determines a bandwidth to be limited, an aggregate flow whose bandwidth is limited, or an aggregate flow whose limited bandwidth is released on the basis of the status information and a current network status.

5. A method of limiting bandwidths of burst aggregate flows, the method comprising:
   (a) obtaining bandwidth of at least one input aggregate flow, determining abnormal grades of the input aggregate flows, and storing the obtained bandwidth;
   (b) determining whether a network congestion risk exists by comparing a total bandwidth of the input aggregate flows with predetermined bandwidths allocated to the normal aggregate flows;
   (c) if it is determined that the network congestion risk exists in step (b), determining burst aggregate flows, the bandwidths of which are limited, and storing the result;
   (d) determining bandwidth to be limited with respect to the burst aggregate flows and storing the result; and
   (e) if it is determined that the network congestion risk does not exist in step (b), releasing the aggregate flows, the bandwidths of which have been limited, and storing the result.

6. The method of claim 5, wherein step (b) comprises:
   if the total bandwidth is larger than the bandwidths allocated to the normal aggregate flows, determining that the network is in a hazardous state; and
   if the total bandwidth is smaller than the bandwidths allocated to the normal aggregate flows, determining that the network is in a normal state.

7. The method of claim 5, wherein step (c) comprises:
   (c1) setting a total bandwidth allocated to the normal aggregate flows as a margin bandwidth, a least abnormal grade as an abnormal grade, and all aggregate flows as a burst aggregate flow list, respectively
   (c2) searching an aggregate flow corresponding to the abnormal grade and having the smallest bandwidth in the burst aggregate flow list;
   (c3) if the aggregate flow satisfying the conditions in step (c2) does not exist, repeating the search by adding one level to the abnormal grade;
   (c4) if the aggregate flow satisfying the conditions in step (c2) exists, and if the margin bandwidth is larger than a bandwidth of the aggregate flow, regarding the aggregate flow as the normal aggregate flow, removing the aggregate flow from the burst aggregate flow list, and subtracting a bandwidth of the normal aggregate flow from the margin bandwidth;
   (c5) selecting burst aggregate flows by repeating steps (c1) though (c4) until there is no aggregate flow requiring a smaller bandwidth than the margin bandwidth, or until there is no aggregate flow to be further searched;
   (c6) adding a total the bandwidth allocated to the burst aggregate flows and the total bandwidth allocated to the normal aggregate flows and substituting a margin bandwidth for the added bandwidth;
   (c7) calculating a bandwidth limited according to each abnormal grade on the basis of the substituted margin bandwidth and an bandwidth allocation policy by abnormal grade; and
   (c8) classifying aggregate flows in the burst aggregate flow list with the abnormal grades, allocating a limited bandwidth corresponding to each abnormal grade, and determining a bandwidth volume of an abnormal aggregate flow designated as the burst aggregate flow.

8. The method of claim 7, wherein step (c7) comprises:
   calculating the bandwidth by multiplying the substituted margin bandwidth by a predetermined ratio.

9. A computer readable medium having recorded thereon a computer-readable program for performing the method of claim 5.

* * * * *